Figure 1:
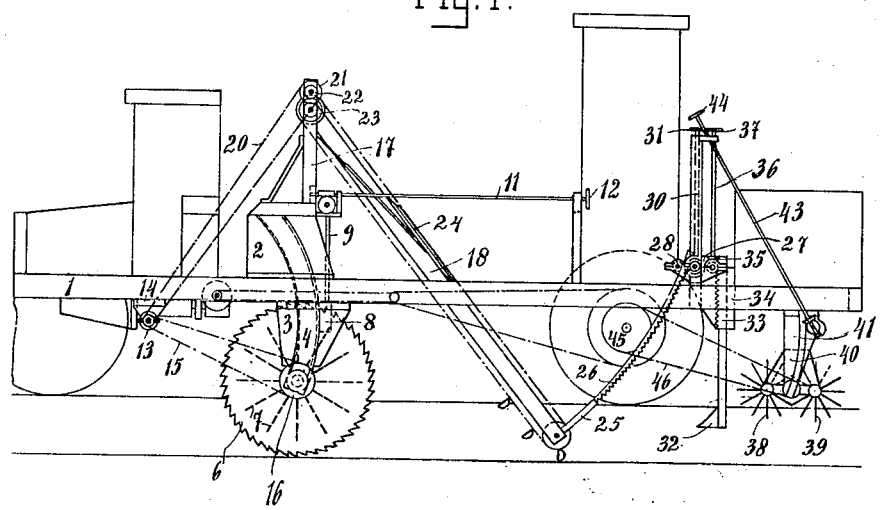

July 8, 1924.  
J. J. M. ELIAS  
1,500,864  
METHOD AND MACHINE FOR DIGGING IRRIGATION AND PLANTING FURROWS  
Filed Dec. 12, 1922

Patented July 8, 1924.

1,500,864

UNITED STATES PATENT OFFICE.

JOAN J. M. ELIAS, OF BANJOEMAS, JAVA.

METHOD AND MACHINE FOR DIGGING IRRIGATION AND PLANTING FURROWS.

Application filed December 12, 1922. Serial No. 606,467.

*To all whom it may concern:*

Be it known that I, JOAN JACOB MARI ELIAS, a citizen of the Dutch East Indies, a resident of the city of Banjoemas, residency of Banjoemas, Isle of Java, have invented certain new and useful Improvements in Methods and Machines for Digging Irrigation and Planting Furrows, of which the following is a full, clear, and exact specification.

My invention relates more particularly to a method and a machine for digging irrigation and planting-furrows for the culture of sugar-cane.

The object of my invention is to provide an improved machine especially adapted to prepare the soil for receiving the sugar-cane cuttings in such a way that all the other operations of the sugar-cane-culture can be carried out entirely mechanically.

By the method heretofore generally used the field to be cultivated is provided with the irrigation-furrows which slope down in the same direction as the field, after which planting-rows in the form of rectangular holes are dug at right angles to the irrigation-furrows, the excavated earth being piled up aside of the holes. After the same has been exposed for some time to the influence of the sun and the atmosphere, the holes are refilled partly with the excavated loose earth and then the sugar-cane-cuttings are planted.

The above-mentioned rows of piles form obstacles preventing the further mechanical cultivation of the field.

By the method according to my invention the planting-rows are made in the form of continuous furrows parallel to the irrigation-furrows and so too in the direction of the slope of the field, while the excavated earth is spread out aside of the dug furrows in which are traced the ridges in which the sugar-cane-cuttings are deposited.

The machine according to the invention with which the improved method is to be carried out is provided with a set of sawdisks, between which disks are arranged sets of beaters, a bucket elevator with a sideways delivering chute-table, a single or plural coulter and one or more rotary rakes, which tools and implements are mounted one after the other in the direction in which the machine is moved, on a carriage frame, which tools and implements are each driven independently of each other and adjustable at the required depth in the working position and may each be brought into the retracted position out of action.

When irrigation-furrows are to be made, the coulter and the rotary rakes are raised out of contact with the ground and only the saws and beaters and the bucket elevator are in action. The earth which has been cut and ground by the saws and beaters is removed by the bucket elevator and spread along the side of the furrow.

When planting-furrows are to be made, the bucket elevator is out of use and the saws and beaters, the coulter and the rakes are in use. The coulter traces in the soil, which has been broken and loosened by the saws and the beaters, the planting-ridge while by the rotary rakes the earth is subjected to a further grinding.

With the machine according to the invention it is possible to work the ground to be cultivated ready to receive the sugarcane-cuttings or suckers in the shortest time and at the lowest cost and the least possible trouble.

Reference is to be had to the accompanying drawings forming a part of this specification in which similar characters of reference indicate corresponding parts in all the figures.

Figure 2:
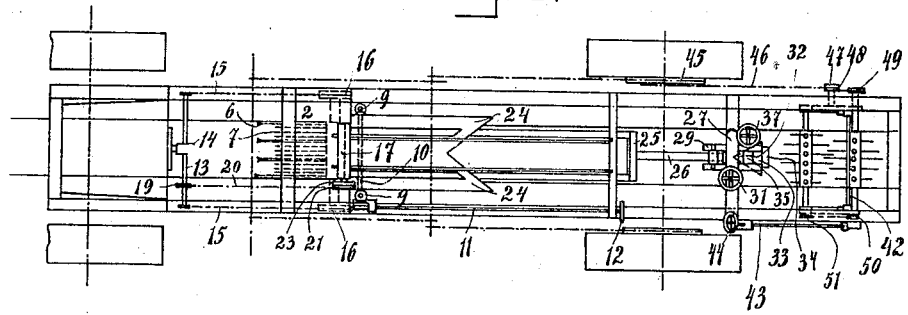

Figure 1 a side elevation and
Figure 2 a plan view of the improved machine.

On a motor carriage frame 1 a bearing 2 is mounted and a bearing 3 is fixed at the underside of the carriage frame. In these two bearings a curved frame 4 is guided, which is movable up and down.

This frame 4 bears a horizontal shaft 5 on which four saw-disks 6 are fixed. Alternately with the saw-disks are arranged on the same shaft 5 sets of beaters 7, each set consisting of three series of tines or pointed arms mounted in the form of a star in bosses. The tines or arms of the beaters, which loosen or grind the earth cut by the saws are shorter than the radius of the saw-disks.

In order to move the frame 4 upward and downward the curved sides of same are provided with teeth, into which worms 8 are engaged, which are mounted on vertical shafts 9. These shafts 9 are rotated by means of bevel-gearings by a horizontal shaft 10, which extends between the upper ends of the shafts 9. One of the outer ends of the shaft 10 carries a worm-wheel actuated by a worm fixed to the one end of a horizontal spindle 11, which is provided at the other end with a hand-wheel 12. By turning this wheel the saw-disks 6 and the beaters 7 can be adjusted at the required working-depth or brought out of engagement with the ground.

The shaft 5 is driven by a shaft 13 by means of chain-wheel gear 15, which shaft 13 is turned by the motor of the vehicle by means of a worm-drive 14 and a friction-coupling mounted in the fly-wheel. This coupling is arranged in front of the gear-box in order to be able to drive the saws and beaters likewise when the vehicle does not move.

Upon the bearing 2 a second bearing 17 is fixed in which the upper end of a bucket elevator 18 is pivoted and the driving-gear of the elevator is mounted. The bucket elevator which is of some known construction is driven by the shaft 13 by means of a driving-gear comprising a chain-wheel 19 on the shaft 13 and coupled to same by means of a friction coupling, a chain 20, a chainwheel 21 and toothed-gearing 22, 23.

The lower end of the bucket elevator is suspended by a bow 25 to a curved toothed-rack 26, which passes between a driving pinion 27 and a guideroll, mounted in a support 29. By means of a bevel-gear the pinion 27 can be rotated by a vertical spindle 30 provided at the upper end with a hand-wheel 31. By turning this hand-wheel 31 the lower-end of the bucket elevator can be adjusted at the required working-position or brought into the retracted position.

The earth excavated by the elevator falls on a chute-table 24, which delivers the earth sideways and spreads same flat along the furrow. In order to prevent the earth from falling into the furrow the lower part of the table is provided with a rim. As the table 24 is fixed to the side bars of the bucket elevator the table has the same displacements as the elevator.

Behind the bucket elevator a double coulter 32 is provided, fixed to the lower end of a toothed-rack 33 guided in a support 34. By moving a hand-wheel 37 at the top of the spindle 36 and by means of a bevel-gear a pinion 35 can be rotated which actuates the toothed-rack 33.

In this way the coulter 32 can be adjusted at the required depth and brought in and out of action.

The coulter is followed by a set of two rotary rakes 38 and 39 the shafts of which bear in a frame 40, the latter being adjustably guided in a bearing 41.

In order to bring the rakes in the desired position the sides of the frame 40 are provided with curved tooth-racks, engaged by pinions, which are mounted on a horizontal shaft 42. By rotating a hand-wheel 37 fixed at the top of a spindle 43 and by means of a bevel-gear the shaft 42 can be moved in the desired direction and in this way the rakes brought in the required position.

The rotary rakes are driven by means of a driving gear comprising a set of sprocket-wheels 47, 48, 49, 50 and 51 and suitable connecting chains of which sprocket-wheels the wheel 47 is actuated by a chain 46 and sprocket-wheel 45 which can be coupled to one of the rear-wheels of the carriage by a friction-coupling, which is adjustable from the seat of the operator.

The rear-wheels of the carriage are driven by the motor in any known way.

The rims of the wheels are broad and provided with angle-iron strips to prevent slipping.

The driver of the carriage has his seat behind the motor whilst the seat of the operator of the different devices is placed above and between the rear wheels.

At the backside of the vehicle is a receptacle to contain tools and spare gear.

The total width of the tool in cross direction formed by the saw disks and the beaters is about 48 c. m. (+19 inch).

The normal average depth position of the saw-disks and the lower-part of the bucket elevator is about 48 c. m. (+19 inch).

The greatest depth at which the double coulter and the rotary rakes are adjusted is about 16 c. m. (+6, 5 inch) below the surface.

Having now particularly described and ascertained the nature of my said invention and in what manner the same is to be performed, I declare that what I claim is:

1. An improved method for preparing a field to receive sugar-cane-cuttings or suckers by providing the field with irrigation-furrows running in the same direction as the slope of the field and digging continuous planting-furrows parallel to the irrigation-furrows and simultaneously spreading the excavated earth flat and even along the furrows in which the planting-ridges are traced.

2. A soil working machine comprising a motor driven frame, a set of saw-disks mounted below the frame and arranged for vertical adjustment, beaters arranged between the saw-disks, coulters carried by the frame and arranged in the rear of the saw-disks and beaters and rotary rakes carried by the frame and arranged in the rear of the coulters said coulters and rotary rakes being also mounted for vertical adjustment, and means for independently driving the saw-disks and beaters and the said rotary rakes.

3. A soil working machine comprising a motor driven frame, a set of saw-disks mounted below the frame, beaters arranged between the saw-disks, a bucket elevator mounted on the frame and having a sideways delivering chute table, and driving means for the saw-disks and beaters and for the said bucket elevator.

In testimony whereof, I have signed my name to this specification.

J. J. M. ELIAS